Figure 1:
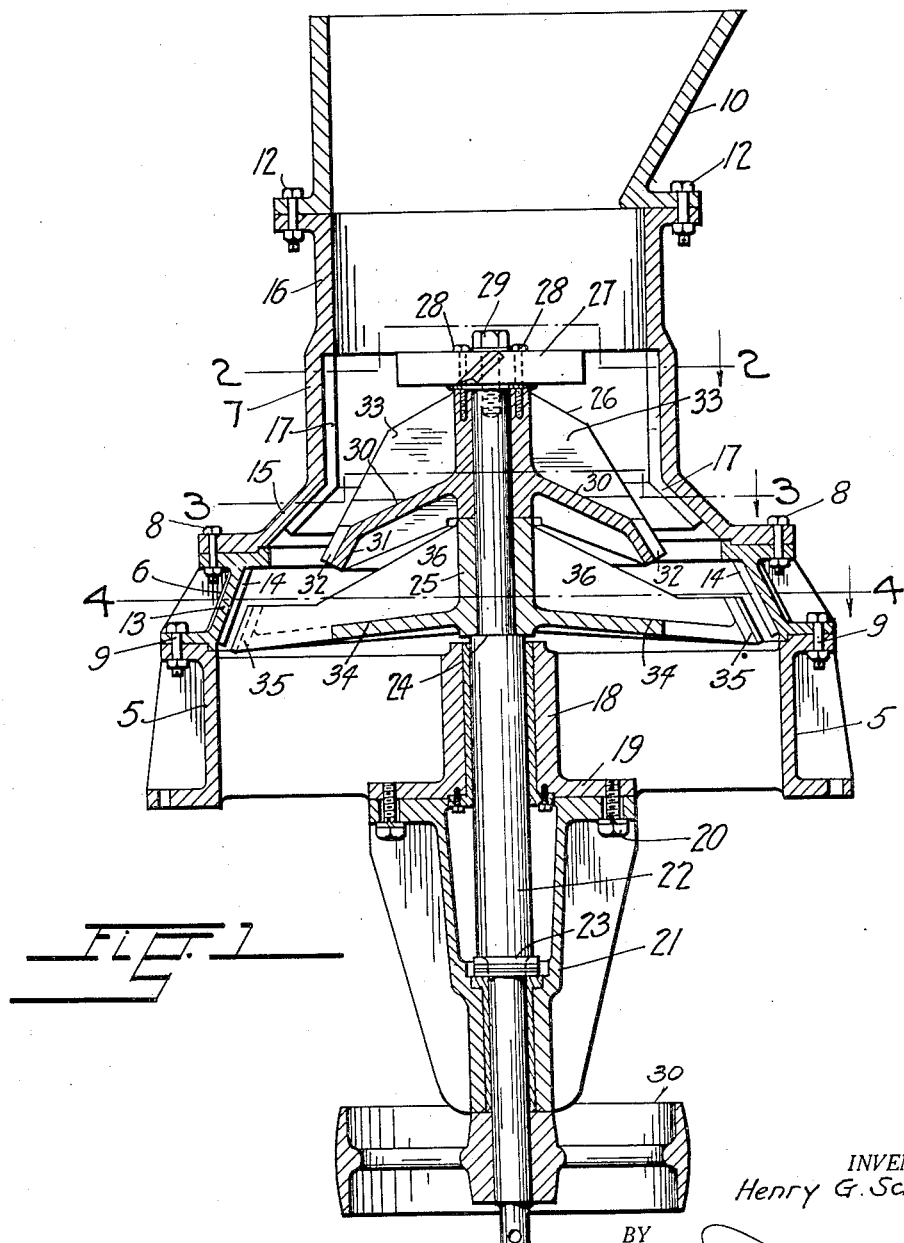

June 10, 1930.  H. G. SCHWARZ  1,762,592
SHREDDING MACHINE
Filed March 26, 1927   2 Sheets-Sheet 1

INVENTOR.
Henry G. Schwarz
BY
ATTORNEY.

June 10, 1930.　　H. G. SCHWARZ　　1,762,592
SHREDDING MACHINE
Filed March 26, 1927　　2 Sheets-Sheet 2
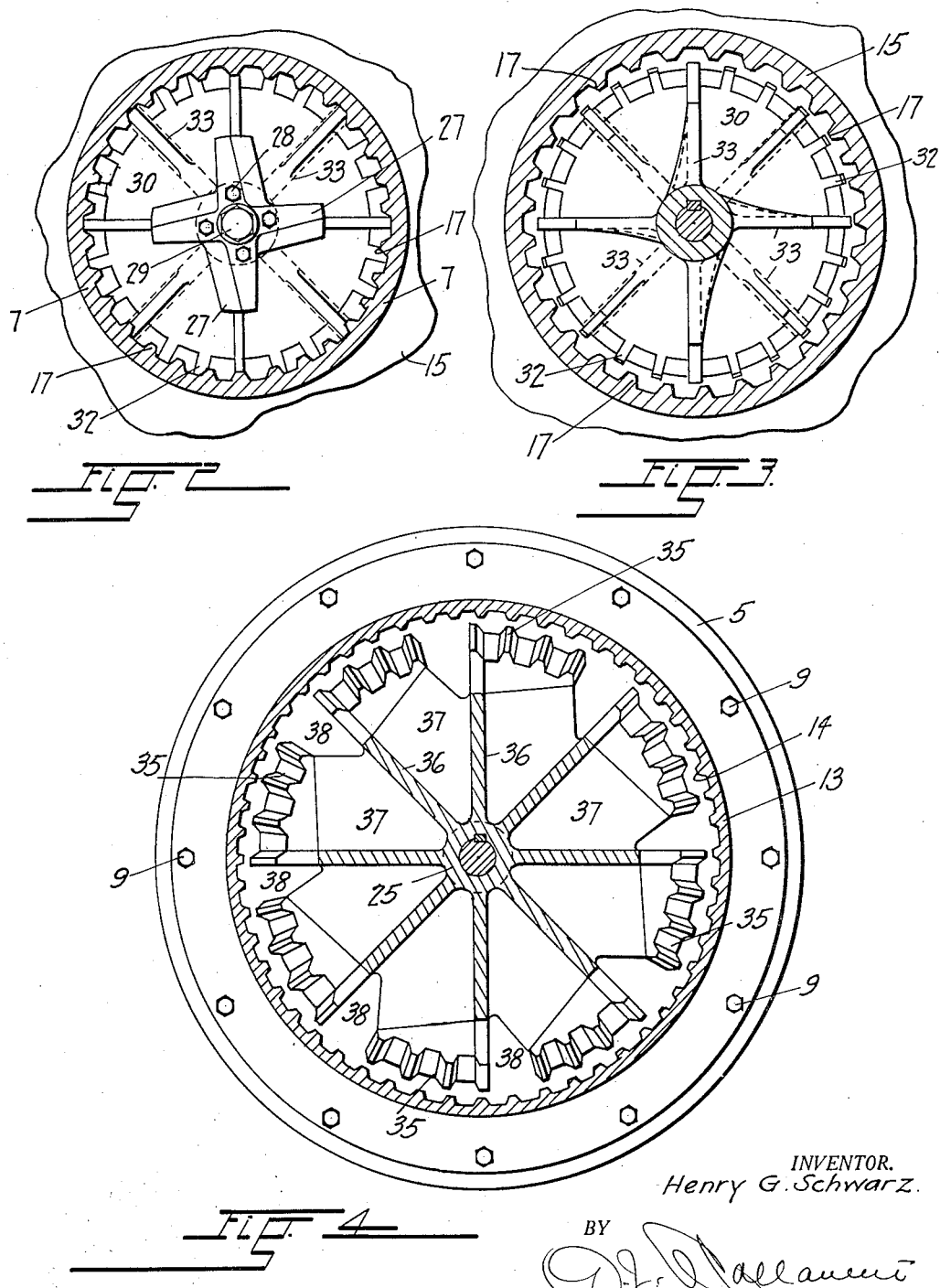
INVENTOR.
Henry G. Schwarz.
BY
ATTORNEY.

Patented June 10, 1930

1,762,592

UNITED STATES PATENT OFFICE

HENRY G. SCHWARZ, OF DENVER, COLORADO

SHREDDING MACHINE

Application filed March 26, 1927. Serial No. 178,651.

This invention relates to shredding machines of the type used for the reduction of vegetable or organic matter, such as fruits, pineapple waste, beet pulp, cabbage, roots, fish residue, etc.

The present invention is particularly adapted for use in shredding the peelings, shells, cores and ends of pineapples and other similar fruits and one of its objects is to provide a machine by which matter of the above stated nature is reduced to a pulp of substantially uniform fineness, thereby facilitating subsequent extraction of the juices and drying of the residue.

Another object of the invention is to provide a shredding machine in which metal objects accidentally fed to the grinding mechanism with the material to be reduced, are automatically discharged from the machine without interfering with its operation, without damage to any of the operating parts thereof and without causing the discharge of any of the material in its unreduced condition.

Another object of the invention resides in providing a machine of the above described character which is of small and compact construction, requiring little floor space in comparison with other shredding machines of similar capacity, and operating with comparatively little power.

A further object is to provide a shredding machine of exceptional strength and durability, little subject to wear or breakage of its operative parts and still other objects reside in details of construction as will be fully explained in the course of the following description.

In the accompanying drawings, in the several views of which like parts are similarly designated, Figure 1 represents a sectional elevation of a shredding machine constructed in accordance with my invention, Figure 2, a horizontal section taken on the line 2—2 Figure 1, Figure 3, a similar section along the line 3—3 Figure 1, and Figure 4, a similar section on the line 4—4 Figure 1.

An annular base 5 supports one upon another, two annular housing sections 6 and 7, in axial alinement. The housing sections are flanged at their ends and they are fastened together and jointly to the base, by means of bolts 8 and 9. The upper section supports a feed hopper 10 secured to its upper flange by bolts 12. The lower housing section has a conoidal wall 13 provided at its inner surface with upwardly extending teeth 14.

The upper housing section has a conoidal wall 15 terminating in a cylindrical top 16 upon which the feed hopper is supported. The conoidal wall portion and the lower part of the cylindrical top portion of the upper section are likewise provided with upwardly ranging teeth 17 and the two housing sections are proportioned so that the conoidal wall of the upper one is substantially a continuation of that of the lower one.

The toothed conoidal wall of the upper section is however, slanted at a flatter angle than the corresponding wall of the lower section so that it is better capable of retaining the material as will hereinafter be more fully described.

The base member has a central hollow core 18 and fastened to a flange 19 at the lower end of this core by bolts 20, is a bearing 21 in which is mounted an upright shaft 22 in coaxial relation to the housing. The shaft has a shoulder 23 for its support in the bearing, and a second shoulder 24 for the shredder members of the machine which cooperate with the slanting teeth of the housing to reduce the material under treatment.

The shredder members hereinbefore referred to are a lower member 25 cooperating with the teeth on the lower housing section and directly supported on the shoulder 24 of the shaft, a second member 26 cooperating with the teeth on the conoidal wall of the upper housing section and supported upon the lower member, and an upper member 27 supported on the second member at the upper end of the shaft.

The members are secured against displacement by screws 28 extending through openings in the hub of the upper member, into correspondingly threaded apertures in the hub of the second member and by a bolt 29 screwed into a threaded opening in the end of the shaft. A pulley 130 at the lower end of the shaft provides means for its rotation by connection with a conveniently located source of power.

The upper member consists of a star wheel the radially projecting cutter arms of which are sharp edged for the initial reduction of the material fed into the hopper. The member furthermore functions to force the material downwardly onto the next following member and to press it against the teeth in the cylindrical portion of the upper housing section which restrict the downward movement so that the material may be fed downwardly in proper ratio to the discharge of the finished product.

The shredder member 26 comprises a hub from which extends a conoidal downwardly flaring apron 30 the marginal rim 31 of which is bent downwardly at a steeper angle. The rim has exterior teeth 32 which are partially opposite to and cooperate with the teeth in the corresponding housing section, and upon the apron above the rim are scroll shaped sharp-edged cutter blades 33 which cut into the material pressed downwardly by the star wheel and force it outwardly against the internal teeth of the housing.

The lower shredder member is composed of a hub having at its lower end a conoidal apron 34 of flatter angle than that of the upper member, provided at its peripheral edge with an externally toothed rim 35 of conoidal shape placed opposite and in spaced relation to the internal teeth 14 of the conoidal housing section 6.

The member 25 has upon its apron, upstanding webs 36 forming pockets 37 and the apron and the rim at the edge thereof, are cut away at the ends of these pockets to provide discharge openings 38.

In the operation of the machine the material fed into the hopper is initially divided by the star wheel on the rotating shaft and forced downwardly upon the shredder member 26. The scroll shaped sharp-edged cutter blades 33 of the member further divide and reduce the material which subsequently passes into and through the space between the externally toothed rim 31 and the conoidal series of teeth 17 on the section of the housing opposite thereto, where it is further reduced by the tearing action of the teeth and by friction of the parts held by the teeth of the stationary housing and those held by the teeth of the rotating element.

From the last mentioned space the material passes into and through the space between the toothed rim 35 of the lower shredder member and the corresponding internally toothed wall 13 of the lower housing section where by the rotary movement of the member, the operation of reducing the material to the desired fineness is completed.

It will be observed that throughout the operation the material is subject to centrifugal force which tends to move it outwardly against the wall of the housing. When metal parts are fed into the hopper with the material, as frequently occurs, they will obviously, by reason of their greater specific gravity, fall at a flatter angle upon the apron of the upper shredder member. The heavier material is thrown with greater force against the conoidal wall 15 than the lighter material. This will cause the heavier material to rebound and drop through the openings 38. The centrifugal force created by the rotation of the shredding member will partially sustain the lighter material but is not sufficient to sustain the heavier material, which therefore drops through said openings.

The rim of the upper shredder member terminates at a lower elevation than the corresponding teeth of the housing and it will thus be evident that the metal parts may pass through the machine without coming in contact with any of the teeth thereof.

It is also to be noted that only parts of heavy weight will fall into the pockets and out through the openings at the ends thereof inasmuch as the parts of the material even though they be in size as large or larger than the metal objects, are thrown against the wall of the housing to be reduced by the breaking action of the rotary parts. If only small metal parts, such as nails, pins or small nuts are intermixed with the material, the discharge openings of the lower shredder member may be omitted or made smaller and the toothed rim at the edge of the member 25 can be continuous.

It will be apparent that owing to the different angles of the teeth in the upper conical part of the housing and the teeth in the conical lower part of the same with relation to the vertical, they will retain the material according to its different degrees of coarseness. Thus the material in the space between the stationary conical series of teeth 17 and the teeth of the rotating upper member passing through quicker than the finer matter in the space between the stationary conoidal series of the teeth 14 and the teeth of the rotating lower breaker or shredder member.

In either case the material is held between the stationary teeth and reduced by the tearing and grinding action of the teeth on the revolving element and as stated hereinbefore by the frictional engagement of the parts held between the teeth. It is also to be noted that owing to the larger size of the lower cone shaped shredder member, it has peripherally a greater velocity than the smaller upper member, which is of advantage since the finer material requires a greater velocity for its diminution in a certain period than the coarser matter.

The slanting position of the toothed parts between which the material is reduced insures a constant downward movement combined with a restraining action as hereinbefore explained.

Variations in the construction, form and relative arrangement of the parts may be resorted to in order to adapt the machine for the reduction of different materials, for example the slants of the parts between which the material is ground may be changed, the relative diameters of the same may be varied, additional grinding members of progressively increased diameters may be employed in a similar arrangement, if the material to be reduced is not very coarse originally, the upper shredder member can be made similar to the lower one provided it is of smaller diameter and while the driving pulley as shown is at the lower end of the shaft, it may be arranged at the top of the machine if so desired.

In place of a pulley drive, a motor directly connected to the vertical shaft may be used either below or above the machine.

Having thus described my invention, what I claim and desire to secure by Letters Patent is:—

1. A shredding machine comprising an internally toothed housing, and a rotary element including a downwardly flaring apron and at the periphery thereof a toothed rim in cooperative relation to the teeth of the housing, the apron having radial webs providing pockets and the rim and the apron being recessed at the ends of the pockets for the discharge of objects passing downwardly upon the apron.

2. A shredding machine comprising an internally toothed housing, and a rotary element including a downwardly flaring apron, radial webs providing pockets above the apron, and peripherally of the apron, a toothed rim in cooperative relation to the teeth of the housing.

3. A shredding machine comprising a housing having distinct circular series of downward-outwardly slanting teeth, of different diameters, one above another, and a rotor having circular series of teeth slanting in corresponding direction opposite to the series of teeth in the housing and in spaced relation to the same, the slant of the lower series of teeth being steeper than that of the upper series.

4. A shredding machine comprising a housing having circular series of teeth, and a rotor in the housing provided with a series of teeth and with scroll-shaped cutter-blades above the same, the teeth on the rotor, and the cutter blades being cooperatively opposite to the teeth of the housing.

5. A shredding machine comprising a housing having circular series of teeth, a rotor in the housing provided with a series of teeth and with scroll-shaped cutter-blades above the same, the teeth on the rotor, and the cutter-blades being cooperatively opposite to the teeth of the housing, and cutting means on the rotor, above the cutter-blades, to press feed material into the path thereof.

6. A shredding machine comprising a housing having a circular series of teeth, and a rotor including a shredding element provided with peripheral teeth cooperatively opposite to the teeth of the housing, and with openings extending further inwardly toward the axis of rotation for the discharge of heavier foreign objects fed with material toward the element.

7. A shredding machine comprising a housing having a circular series of teeth, and a rotor including a shredding element provided with a circular series of teeth cooperatively opposite to the teeth of the housing and segmented by openings that are extended toward the axis of rotation for the discharge of heavier foreign objects fed with material toward the element.

8. A shredding machine comprising a housing having internal teeth, a rotor having peripherally toothed cutting elements, one above another, in cooperative spaced relation to the teeth of the housing, the space of the upper element being nearer the center of rotation than that of the lower element and the latter having openings beneath the space of the upper element, for the discharge of heavy foreign objects passing through said space with the material.

9. A shredding machine comprising an internally toothed housing, a rotary element having teeth cooperating with the teeth of the housing, and radial webs on the element providing pockets to feed material to the teeth.

In testimony whereof I have affixed my signature.

HENRY G. SCHWARZ.